(12) United States Patent
Chen

(10) Patent No.: US 6,620,901 B2
(45) Date of Patent: Sep. 16, 2003

(54) HIGH CARBON YIELD PHENOLIC RESOLE

(75) Inventor: Jimmy Pingao Chen, Prospect, KY (US)

(73) Assignee: Borden Chemical, Inc., Columbus, OH (US)

( * ) Notice: Subject to any disclaimer, the term of this patent is extended or adjusted under 35 U.S.C. 154(b) by 32 days.

(21) Appl. No.: 10/023,780

(22) Filed: Dec. 14, 2001

(65) Prior Publication Data

US 2003/0135012 A1 Jul. 17, 2003

(51) Int. Cl.[7] ............................. C08G 14/06; C08G 8/10
(52) U.S. Cl. ..................... 528/129; 528/137; 528/142; 528/145
(58) Field of Search ................................. 528/129, 137, 528/142, 145

(56) References Cited

U.S. PATENT DOCUMENTS

| | | |
|---|---|---|
| 4,206,095 A | 6/1980 | Wynstra et al. |
| 4,366,303 A | 12/1982 | Kopf |
| 4,501,836 A | 2/1985 | Nakamura et al. |
| 4,539,343 A | 9/1985 | Nishimura |
| 5,043,412 A | 8/1991 | Chandramouli et al. |
| 5,686,506 A | 11/1997 | Gerber |
| 5,760,104 A | 6/1998 | Gerber |

OTHER PUBLICATIONS

Copy of International Search Report for International Application No. PCT/US02/15247.

*Primary Examiner*—Duc Truong
(74) *Attorney, Agent, or Firm*—Gardner Carton & Douglas LLC

(57) ABSTRACT

A high-carbon-yield resole by reacting formaldehyde and excess phenol to an endpoint and then cross-linking with HMTA. Similar high-carbon-yield resoles result with addition of DBE-2, furfuryl alchol and furfural.

20 Claims, 5 Drawing Sheets

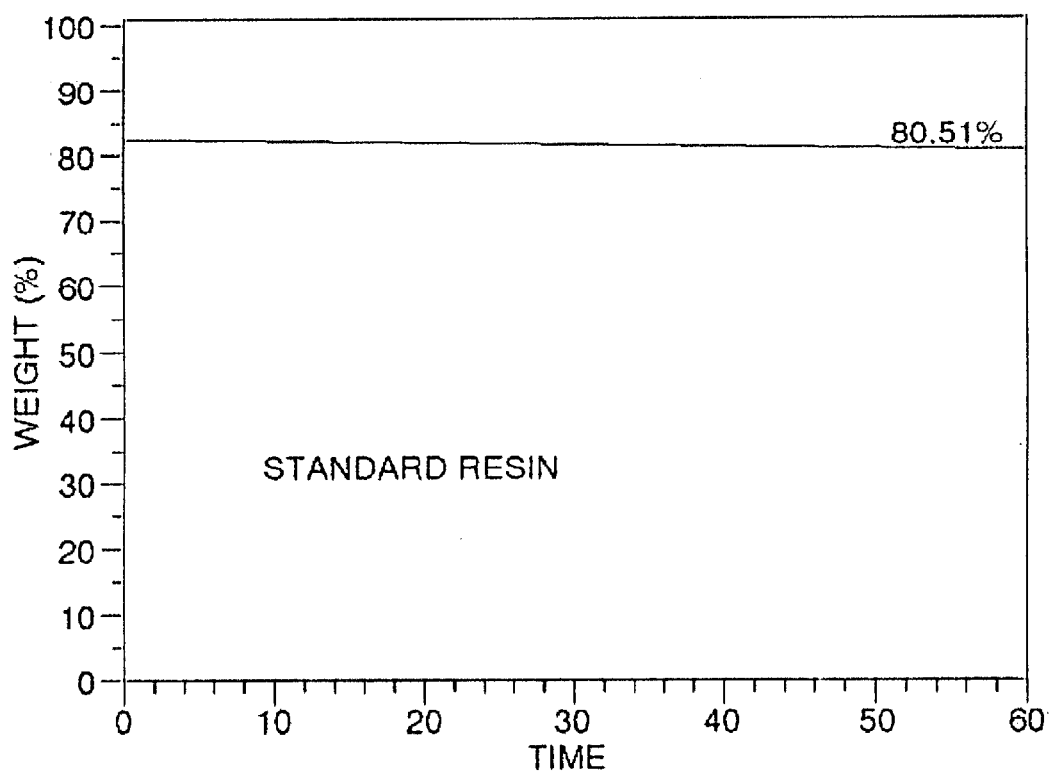

HIGH CARBON YIELD PHENOLIC RESOLE

FIELD OF INVENTION

Figure 1:
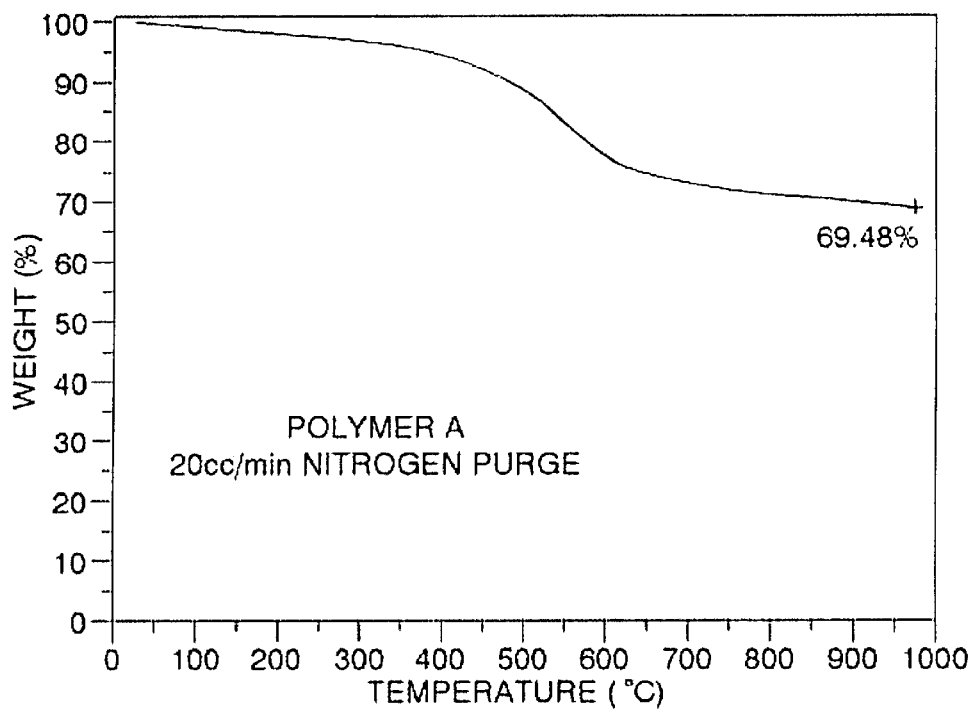

The invention relates to a cross-linked phenolic resole. This resole demonstrates a high carbon yield when used as a refractory binder and it exhibits high temperature and oxidation resistance plus the enhancement of thermal shock resistance.

BACKGROUND

Among the many uses for phenolic resins is their use in the production of refractory materials. Refractory materials are generally made of basic aggregates and phenolic resins as binders. The aggregates are mixed with the resins and then pressed or molded into a desired shape, i.e., brick, castables and so forth. The aggregate may also be used to make unshaped refractories. Particular refractories, such as refractory bricks, are used to line the inside wall of high temperature kilns or furnaces. The resins used for this purpose are usually thermosetting or may be cured at room temperature by the addition of a catalyst.

Phenol-formaldehyde resole resins that cure at ambient temperatures may have unacceptable thermal properties. For example, they may crack or tear when subject to the high temperatures of a kiln or furnace. The resins should optimally contribute carbon when subject to the temperatures of a kiln or furnace. The carbon contributes to the dimensional stability of the refractory articles via refractory bonding and high thermal conductivity and provides abrasion resistance. As one example, room temperature cured refractory binder comprising a novolac, a resole, and an ester as the curative is reported to improve carbonization of the resin binder and have improved thermal properties.

Refractory compositions, when molded and fired, may not have satisfactory flexural strength. The strength of refractories can be improved if the phenolic resin binder is added in large quantities during the production of the refractory material. However, the addition of large quantities of phenolic resin binder increases the cost of the refractory material, and the excessive phenolic resin in refractories generates a large quantity of hydrogen gas on decomposition which takes place when the refractories come into contact with molten metal. In the case of cast iron, the hydrogen enters the molten metal and stays in the free form, causing cold brittle fractures of the cast iron. Improved flexural strength has been reportedly accomplished by mixing a basic aggregate with a phenolic resin and a compound having a $pK_a$ value of less than 9.5 at 25° C., particularly the phenolic resin has been incorporated with methoxymethylphenyl ether.

In an attempt to increase strength, improve cure rates, and prevent melting, amine groups have been incorporated into resins. For example, binders comprising a novolac, and amino-compound, a solvent and water have been useful in binding coked dolomite. The novolac solids are dissolved in a triethylamine ("TEA")/furfuryl alcohol composition. The amino-compound used contained one to five amine groups, preferably two to four. Bricks made from the doloma aggregate mixed with the binder solution are reported to show good ambient temperature green strength and enhanced modulus of rupture after curing and coking.

Particulate resoles useful as refractory binders have been prepared by reacting phenol and formaldehyde with an amine, such as hexamethylenetetramine ("HMTA"), in an aqueous medium containing a colloid. The particulate resole may then be further reacted with an alkaline compound to convert hydroxylic groups to phenate groups. This second step may be a pH dependent equilibrium reaction between the alkaline compound and the phenolic hydroxyl groups. The resins recovered from these processes have exhibited increased cure rates and increased agglomeration without melting. Unlike the present invention where the goal is to pyrolize the carbon, the sintering process of this prior art was to agglomerate the particles without melting them.

High-carbon-yield refractory binders comprising a liquid resole phenolic resin and a solvent, admixed with a tar, pitch or mixture of tar and pitch are known. The resin is prepared using a catalyst system composed of ammonia, amines or a mixture of alkali metal oxides, hydroxides, carbonates in combination with ammonia or amines. The fixed carbon content resulting from use of these binders is greater than the level of fixed carbon content obtained from either the resin or from tar/pitch used individually.

Accordingly, there is a need for a high carbon yield resin useful as a binder in refractory materials and that increases refractory strength and thermal conductivity. There is further a need for a high carbon yield resin that is economical to make and use. And further a need to simplify the process by which such resins are produced. There is a need for a refractory material having these properties that does not also require large quantities of phenolic resin binder which increases the cost of the refractory in order to provide the required strength of the material.

SUMMARY OF THE INVENTION

The present invention provides a high carbon yield phenolic resole for use in the manufacture of refractory materials. The high carbon yield phenolic resole is a pre-cross linked, pre-cured resole which comprises a liquid resole having a phenol to formaldehyde mole ratio (P/F) ranging from about 1/0.5 to about 1/3.5. Preferably, the P/F ratio is about 1/0.8 to about 1/1.5. Hexamethylenetetramine may be used as a cross-linking agent in concentrations of about 2 percent to 20 percent based on the weight of the liquid resole to provide the required pre-cure.

The high carbon yield phenolic resole of the present invention demonstrates a surprising and unexpected carbon yield of about 70 percent, as compared to about 50percent to 55 percent when conventional resoles are used, at 1000° C. under nitrogen. The unexpected higher carbon yield is coupled to a complementary unexpected decrease in volatile components. The advantage of the resin of the present invention lies in the fact that it yields significantly fewer volatile components when exposed to elevated temperatures. The lower concentration of volatile components makes this resin particularly suited for use in binding refractory materials.

The resoles described herein are the products of a controlled pre-curing process that increases carbon yield and have not been previously described. These resoles also exhibit an increase in carbon yield that is not predicted by the particular continuum of growth the resoles should adhere to throughout the curing process. These resoles exhibit physical properties that make them particularly suited for use in refractory materials.

DETAILED DESCRIPTION OF THE INVENTION

According to one embodiment of the present invention there is provided a high-carbon-yield resole obtained by reacting a resole and a cross-linking agent such as HTMA.

In further embodiments of the invention the high-carbon-yield resole includes a resole reacted with a cross-linking agent such as HTMA and dissolved in solvents such as DBE-2, furfuryl alcohol, or furfural.

Phenolic Resole

Resole resins are thermosetting, i.e., they form an infusible three-dimensional polymer upon application of heat and are produced by the reaction of a phenol and a molar excess of a phenol-reactive aldehyde typically in the presence of an alkali, alkaline earth, or other metal compound as a condensing catalyst.

The phenolic resole which may be used with the embodiments of the present invention may be obtained by the reaction of a phenol, such as phenol itself, cresol, resorcinol, 3,5-xylenol, bisphenol-A, other substituted phenols, and mixtures of any of these compounds, with an aldehyde such as, for example, formaldehyde, paraformnaldehyde, acetaldehyde, furfuraldehyde, and mixtures of any of these aldehydes.

A broad range of phenolic resoles in fact may be used with the various embodiments of this invention. These can be phenol-formaldehyde resoles or those where phenol is partially or completely substituted by one or more reactive phenolic compounds and the aldehyde portion can be partially or wholly replaced by other aldehyde compounds. The preferred phenolic resole resin is the condensation product of phenol and formaldehyde.

A molar excess of aldehyde per mole of phenol is used to make the resole resins used in the present inventions. Preferably the molar ratio of phenol to aldehyde is in the range of from about 1:0.5 to about 1:3.5, and more preferably from about 1:0.8 to 1:1.5. A convenient way to carry out the reaction is by heating the mixture under reflux at atmospheric or reduced pressure conditions. Reflux, however, is not required.

The reaction mixture, is typically heated until from about 80 percent to about 98 percent of the aldehyde has reacted. Although the reaction can be carried out under reflux until about 98 percent of the aldehyde has reacted, prolonged heating is required and it is preferred to continue the heating only until about 80 percent to 90 percent of the aldehyde has reacted. At this point, the reaction mixture is heated under vacuum at a pressure of about 50 mm of Hg until the free formaldehyde in the mixture is less than about 1 percent. Preferably, the reaction is carried out at 95° C. until the free formaldehyde is less than about 0.1 percent by weight of the mixture. The catalyst may be precipitated from the reaction mixture before the vacuum heating step if desired.

Preparation

The preferred phenolic resole used here is a liquid resole having the phenol and formaldehyde reacted to an endpoint by a condensation reaction. The resole is then further reacted by cross-linking with HTMA in a concentration of 2 percent to 20 percent based on the weight of the resole and preferably at a concentration of 8 percent to 12 percent based on the weight of the resole.

The high-carbon-yield resoles were prepared by adding the liquid resole and HTMA at room temperature and then heating the combination to a temperature of 80° C. The HTMA may also be added after the liquid resole resin has been heated. The combination of liquid resole resin and HTMA is held at an elevated temperature for a period of time between 5 and 30 minutes and then cooled.

Diluents may be added to the liquid resole/HTMA combination or to the pre-cured resole. Diluents may include furfuryl alcohol, DBE-2 dibasic ester, furfural, or others. Examples of pre-cured resoles of the present invention are provided below. The resoles of the examples are characterized in Table 1.

EXAMPLE 1

Polymer A

| Conventional Resole | 100 g |
| HTMA | 10 g |

From room temperature the resole resin and hexamethylenetetramine were added and then heated to 80° C. for 15 minutes. The combination was then cooled to room temperature where viscosity, percent free phenol, percent solids and cure time were determined as described below.

The conventional resole of Example 1 is an alkaline-earth-compound catalyzed phenolic resole. Its F/P mole ratio is in the range of 0.8/1–1.2/1, with the major condensation reaction having occurred at 75–85° C. The resin is concentrated with vacuum distillation.

EXAMPLE 2

Polymer B

| Conventional Resole | 100 g |
| HTMA | 4.5 g |

From room temperature the resole resin and hexamethylenetetramine were added and then heated to 80° C. for 5 minutes. The combination was then cooled to room temperature where viscosity, percent free phenol, percent solids and cure time were determined. The conventional resole of Example 2 is the same resole as used in Example 1.

EXAMPLE 3

Polymer C

| Conventional Resole | 300 g |
| HTMA | 30 g |

From room temperature the resole resin was heated to 28° C., then the HTMA was added and the combination further heated to 80°C. and held at that temperature for 30 minutes. The combination was then cooled to room temperature where viscosity, percent free phenol, percent solids and cure time were determined. The resole of Example 3 is the same resole as used in Example 1.

EXAMPLE 4

Polymer D

Polymer D was prepared according to the same procedure as Polymer C, except that furfuryl alcohol was added to the liquid resole resin. The diluent, furfuryl alcohol, was added at room temperature, but could just as effectively be added at higher temperatures.

EXAMPLE 5

Polymer E

Polymer E was prepared according to the same procedure as Polymer C except that DBE-2 dibasic ester was added to the liquid resole resin. The diluent, DBE-2 dibasic ester, was added at room temperature, but could just as effectively be added at higher temperatures.

EXAMPLE 6

Polymer F

Polymer F was prepared according to the same procedure as Polymer C except that furfural was added to the liquid resole resin. The furfural was added at room temperature. Furfural used as a solvent in this application, however, it may react with phenolic polymers under certain conditions. For this application, conditions favoring reactions between phenolic polymers and furfural should be avoided.

The high-carbon-yield resoles of the present invention were further characterized. This further characterization included determination of viscosity, free phenol content, solids content, and cure time. The methods undertaken for these characterizations are described below.

Brookfield Viscosity Determination

Aqueous solutions of the resole were tested for viscosity. Viscosity was determined using the well-known Brookfield Digital Viscometer method. The Brookfield viscometer measures the viscous resistance to a rotating spindle immersed in a fluid. The torque necessary to rotate the spindle in the fluid is expressed in centipoises. The small sample adapter permits the testing of small volumes of liquid while providing temperature control. Brookfield Digital Viscometer, Model DV-II+ was used in combination with the Brookfield Small Sample Adapter, Model SSA31/12RPY. The viscosity determinations tabulated below were made at a temperature of 25° C.

Free Phenol Determination

The unreacted phenol content in phenolic resins may be determined using any of the well known gas chromatographic methods. In the method used in the examples below, a gas chromatograph equipped with an FID detector and a 6'×1/8" column with 1.2 percent Atpet-80 and 6.8 percent di-n-decylphthalate on 60/80 Anachrom ABS is used. The column oven temperature is maintained at about 130° C., the injection port temperature at about 220° C., and the detector temperature at about 220° C. Those of ordinary skill in the art will recognize variations of these components and parameters that may be used. Resin samples are dissolved in a suitable solvent and spiked with p-cresol as a standard. After mixing, the solution of resin, solvent and standard are injected into the gas chromatograph and the areas under the phenol and p-cresol peaks are integrated. The concentration of the free phenol may then be calculated.

Percent Solids Determination

An amount of resin was weighed into a standard dish. The dish was pre-weighed to the nearest 0.1 mg. A sample of resin approximately 1.5 grams was added, dropwise, to the dish. To minimize losses due to evaporation, the sample was not spread out, but was allowed to form a button in the center of the dish. The dish was re-weighed to accurately calculate the true sample weight. The re-weighing of the dish and sample was conducted promptly to minimize losses due to evaporation. The resin was subjected to 135° C. for 3 hours with an,airflow of between 150–200 feet per minute as measured in the middle of the oven. The samples were removed from the oven and placed in a desiccator to cool. When cooled, the dry samples were promptly weighed. Solids content was calculated as (weight of dried residue× 100)/weight of sample=percent solids.

Hot Plate Cure of Liquid Phenol Formaldehyde Resins Determination

The temperature of a hot plate surface was adjusted to 150° C. (approximately 154° C. was read on the thermometer in the block). Approximately 1.25 grams of resin was placed on a spatula and transferred to the center of the hot plate surface. Upon placement of the resin on the hot plate a stopwatch was started. The sample was immediately stroked with the spatula to spread the sample evenly over an approximate 2-inch square area of the hot plate surface. Constant pressure was maintained on the spatula over the sample to facilitate forming a thin film of sample on the hot plate. When the resin no longer "stringed" as the spatula was lifted from the sample, the stopwatch was stopped and the time recorded as cure time.

TABLE 1

Summary of Polymer Results and Characteristics

| Polymer | Resole, grams | HTMA | Viscosity, cps | Percent free phenol | Diluent, grams | Cure time, seconds | Percent Solids |
|---|---|---|---|---|---|---|---|
| A | 100 Conventional Resole | 10 | 5140 | 20.12 | None | 108 | 80.52 |
| B | 100 Conventional Resole | 4.5 | 1120 | 21.89 | None | 140 | 77.63 |
| C | 300 Conventional Resole | 30 | 3855 | 20.00 | None | 112 | 79.56 |
| D | 20.12 g of Components of Polymer C | | 1000 | 20.00 | 2.88 furfuryl alcohol | | |

TABLE 1-continued

Summary of Polymer Results and Characteristics

| Polymer | Resole, grams | HTMA | Viscosity, cps | Percent free phenol | Diluent, grams | Cure time, seconds | Percent Solids |
|---|---|---|---|---|---|---|---|
| E | 20.08 g of Components of Polymer C | | 1044 | | 2.88 DBE-2 | | |
| F | 20.01 g. of Components of Polymer C | | 990 | | 2.88 furfural | | |

The resulting resoles contain a surprisingly high-carbon-yield and, correspondingly, a surprisingly low concentration of volatile components. Resole resins are step-growth polymers that grow by condensation reactions. The terminal functional groups of the step-growth polymer during formation have high mobility relative to the chain as a whole. The mobile functional groups collide with and react with other functional groups thereby adding molecular weight to the molecule. The rate of growth of these polymers is generally linear and predictable, (Chapter 8, *Textbook of Polymer Science* $2_{nd}$ *Edition*, Fred W. Billmeyer, published by John Wiley & Sons, Inc. 1971). Viscosity is known to increase with molecular weight and the molecular weight typically increases along a predicable continuum until the polymer is completely cured.

Thermogravimetric Analysis ("TGA") was used to assess both the weight retention of the polymers of the examples at elevated temperatures and the carbon yield of these polymers. TGA tests run at 400° C. demonstrated weight retention, at that temperature, by the polymers tested. TGA tests run at 1000° C. demonstrated the carbon yield of these polymers.

In performing the TGA tests, about 2 grams of the polymer was weighed in an aluminum pan. The pan was then placed into oven maintained at 110° C. for 30 minutes. The temperature in the oven was then ramped up to 150° C. in 20 minutes and held at 150° C. for 1 hour. Finally, the temperature in the oven was ramped up to 180° C. in 20 minutes and held at 180° C. for 5 hours. The polymer sample was then removed from the oven and granulated in a mortar with a pestle. The resulting particles were screened through a 60 mesh sieve. The powder passing through the 60 mesh sieve was used in the TGA tests. The TGA instrument used was a TGA 2050 available from TA Instruments, New Castle, Delaware.

In one set of the TGA test, the polymer sample was placed in the TGA instrument and the TGA instrument was brought to the test temperature by ramping up the temperature at 200° C. per minute to 400° C. The sample was then held in the TGA instrument at the test temperature for 60 minutes, during which time weight measurements were made. In one set of tests, the test temperature was 400° C. The weight measurements in this test were progressive starting from the elevated temperature of 400° C. In a different set of tests, the test temperature was achieved by ramping up at 20° C. per minute to 1000° C.

In Table 2 below, the results of TGA testing at 400° C. are reported.

TABLE 2

TGA Results for Conventional Resole As Compared to Polymers A and B

| Polymer | Purge | Weight Retention, percent | Improvement in Weight Retention relative to results for Conventional Resole | Weight Retention, percent, for isotherm, 400° C. for 60 minutes | Improvement in Weight Retention relative to Conventional Resole isotherm |
|---|---|---|---|---|---|
| Conventional Resole | Nitrogen 20 cc/min. | 58.40 | | 80.5 | |
| Polymer A | Nitrogen 20 cc/min. | 69.48 | 18.97 | 90.5 | 12.4 |
| Polymer B | Nitrogen 20 cc/min. | 66.31 | 13.54 | 89.9 | 11.7 |
| Conventional Resole | Air 20 cc/min. | 1.401 | | | |
| Polymer A | Air 20 cc/min. | 2.199 | 57.1 | | |
| Polymer B | Air 20 cc/min. | 2.690 | 92.9 | | |

Figure 2:
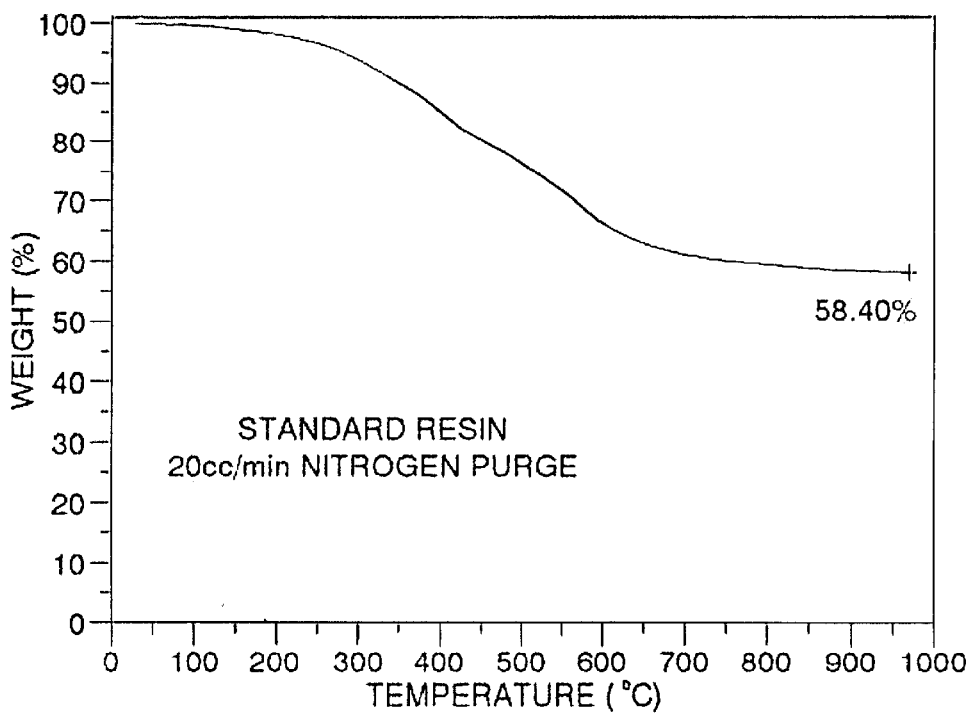
Figure 3:
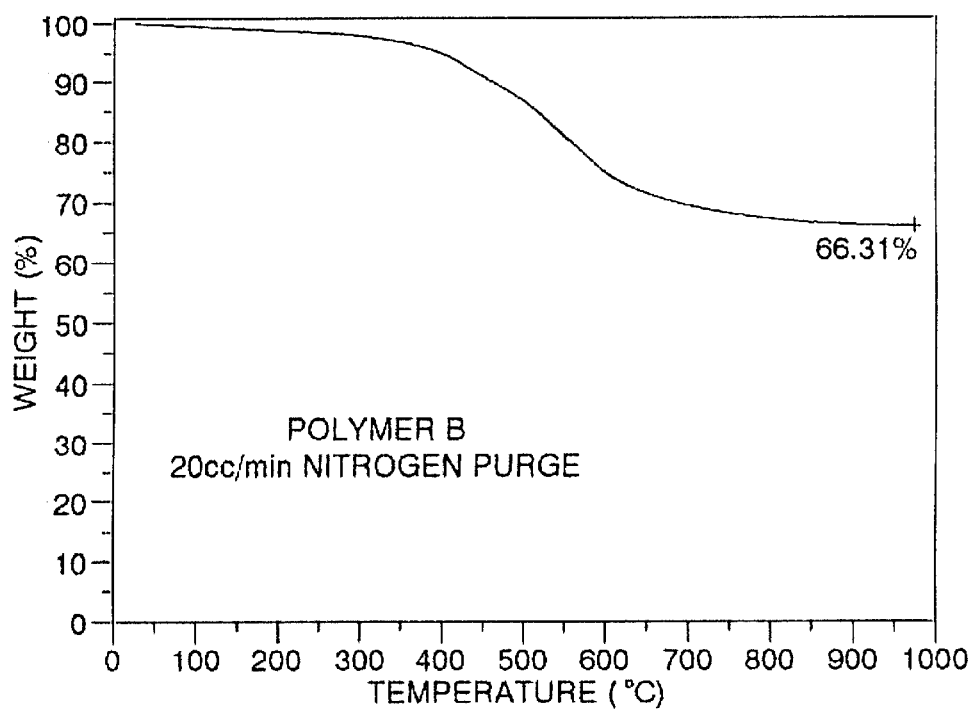

FIGS. 1, 2, and 3 show results from a TGA analysis with a nitrogen purge that tracks loss-in-weight of the sample as the temperature is increased. The loss-in-weight is due to the decomposition of the polymer. The percentage of weight remaining after heating the sample to, or approaching, 1000° C. is reported as carbon yield.

FIG. 1 is a TGA analysis of Polymer A. In FIG. 1, the solids remaining after a temperature increase from room temperature to near 1000° C. represents the carbon yield, 69.48 percent in the case of Polymer A. The change in sample weight as the temperature increases from room temperature to near 1000° C. represents the loss in weight due to decomposition of the sample, or 100 less 69.48 or 30.52 percent, in the case of Polymer A. FIG. 2 depicts the TGA results of an analysis similar to the TGA analysis of FIG. 1, except the analysis was performed on a resole resin that was not pre-cured with an addition of HTMA. The carbon yield of the resole resin without the addition of HTMA is 58.40 percent. The decomposition portion of the resole resin without the addition of HMTA was 100 less 58.40, or 41.60 percent. A comparison of FIGS. 1 and 2 reveals an increase in carbon yield of about 18.97 percent ([(69.48−58.40)/58.40]×100). A comparison of FIGS. 1 and 2 shows a corresponding decrease in the decomposition portion of about 26.6 percent, ([(41.60×30.52)/41.60]×100). The increased carbon yield and corresponding decrease in the volatile concentration of the polymer is not predicted.

FIG. 3 is a TGA analysis of Polymer B. In FIG. 3, the solids remaining after a temperature increase from room temperature to near 1000° C. represents the carbon yield, 66.31 percent in the case of Polymer B. The change in sample weight as the temperature increases from room temperature to near 1 000° C. represents the decomposition portion of the sample, or 100 less 66.31 or 33.69 percent, in the case of Polymer B. A comparison of FIGS. 2 and 3 reveals an increase in carbon yield of about 13.54 percent ([(66.31−58.40)/58.40]×100). The corresponding loss in weight is about 19.01 percent ([(41.60−33.69)/41.60]×100).

A comparison of FIGS. 1, 2 and 3 show that the resoles that are the products of a controlled pre-curing process appear to shift from the predictable growth continuum to another continuum resulting in higher carbon yield. The cross-linked, pre-cured resole surprisingly and unexpectedly produces a significant shift in carbon yield.

Figure 4:
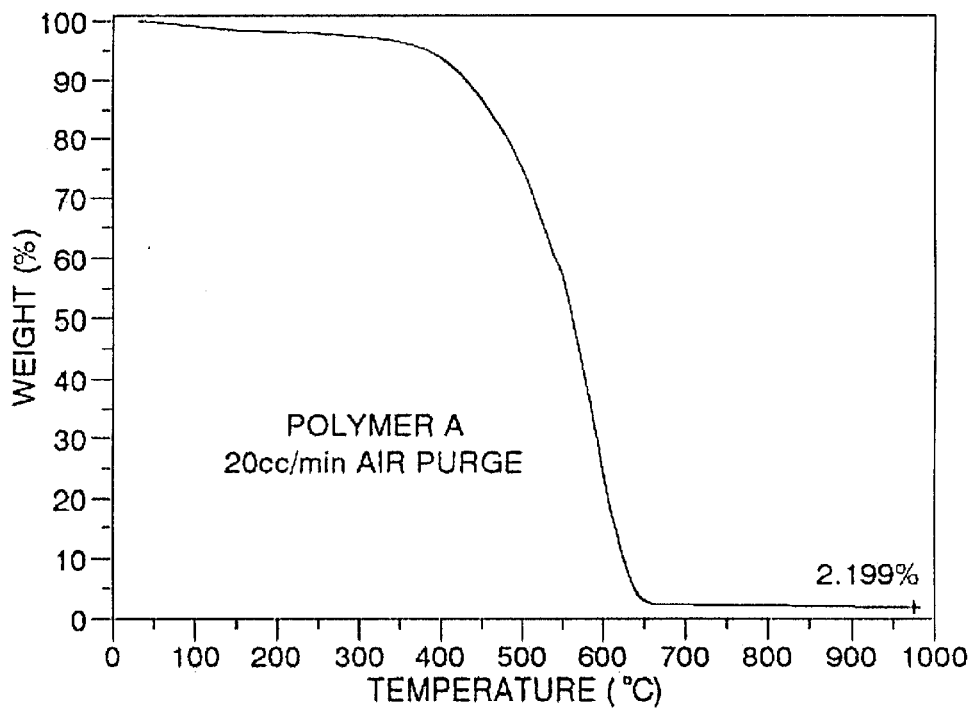
Figure 5:
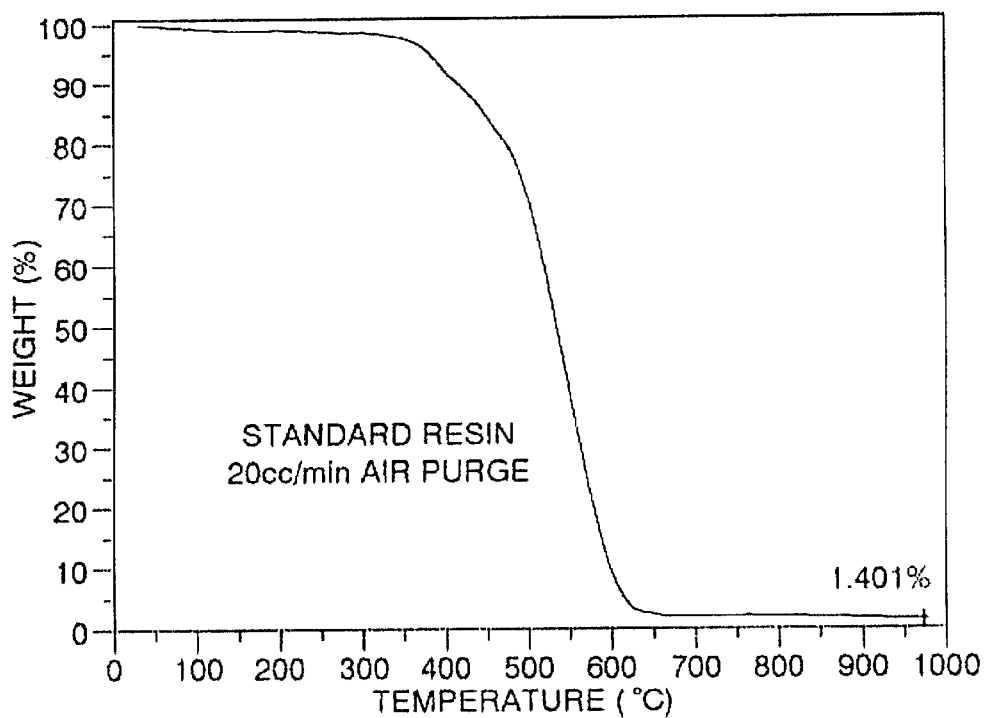
Figure 6:
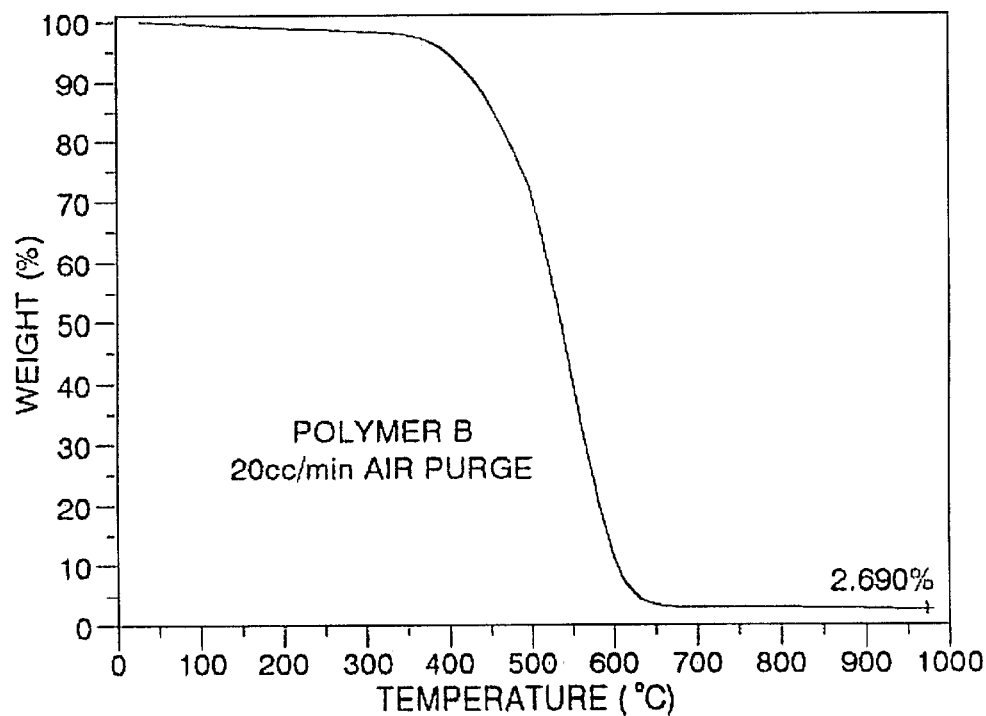

FIGS. 4, 5, and 6 show results from a TGA analysis with an air purge that tracks loss-in-weight of the sample as the temperature is increased. The results depicted in FIG. 4 represent the carbon yield of Polymer A, roughly 2.2 percent. The loss in weight of the sample as the temperature was increased from room temperature to near 1000° C. was 97.8 percent (100 less 2.2), representing a combination of the decomposition and combustion of the sample. FIG. 5 results depict the Polymer with no HTMA crosslinking. FIG. 5 carbon yield is reported as 1.40 percent, leaving a weight loss of 98.60 percent. The increase in carbon yield of Polymer A is approximately 57.1 percent ([(2.2−1.4)/1.40]×100). The corresponding decrease in weight due to a combination of decomposition and combustion of the sample is approximately 0.81 percent. The change in weight retention between Polymer A and the polymer containing no HTMA is most notable at temperatures between 550–600° C. Table 3 tabulates the weight percentages remaining for temperature intervals of the TGA analysis.

TABLE 3

TGA Weight Percentages for Conventional Resole Standard As Compared to Polymer A

| Temperature, ° C. | Standard Polymer, weight percent | Polymer A, weight percent |
| --- | --- | --- |
| 50 | 99.92 | 99.76 |
| 100 | 99.40 | 99.01 |
| 150 | 98.90 | 98.41 |
| 200 | 98.47 | 98.12 |

TABLE 3-continued

TGA Weight Percentages for Conventional Resole Standard As Compared to Polymer A

| Temperature, ° C. | Standard Polymer, weight percent | Polymer A, weight percent |
| --- | --- | --- |
| 250 | 98.09 | 97.74 |
| 300 | 98.04 | 97.14 |
| 350 | 97.34 | 96.35 |
| 400 | 92.22 | 93.72 |
| 450 | 84.04 | 86.89 |
| 500 | 71.91 | 74.92 |
| 550 | 39.51 | 57.78 |
| 600 | 9.695 | 24.96 |
| 650 | 1.525 | 2.678 |
| 700 | 1.526 | 2.420 |
| 750 | 1.484 | 2.357 |
| 800 | 1.419 | 2.284 |
| 850 | 1.368 | 2.257 |
| 900 | 1.433 | 2.257 |
| 950 | 1.435 | 2.234 |

FIG. 6 is a TGA analysis of Polymer B with a 20 cubic centimeter per minute air purge. In FIG. 6, the solids remaining after a temperature increase from room temperature to near 1000° C. represent the carbon yield, roughly 2.7 percent in the case of Polymer B. The change in sample weight as the temperature increases from room temperature to near 1000° C. represents the weight loss due to decomposition and combustion of the sample, or 100 less 2.7 or 97.3 percent, in the case of Polymer B. A comparison of FIGS. 5 and 6 reveals an increase in carbon yield of about 92.9 percent ([(2.7−1.4)/1.4]×100). The corresponding weight loss is about 1.32 percent ([(98.6−97.3)/98.6]×100).

Figure 7:
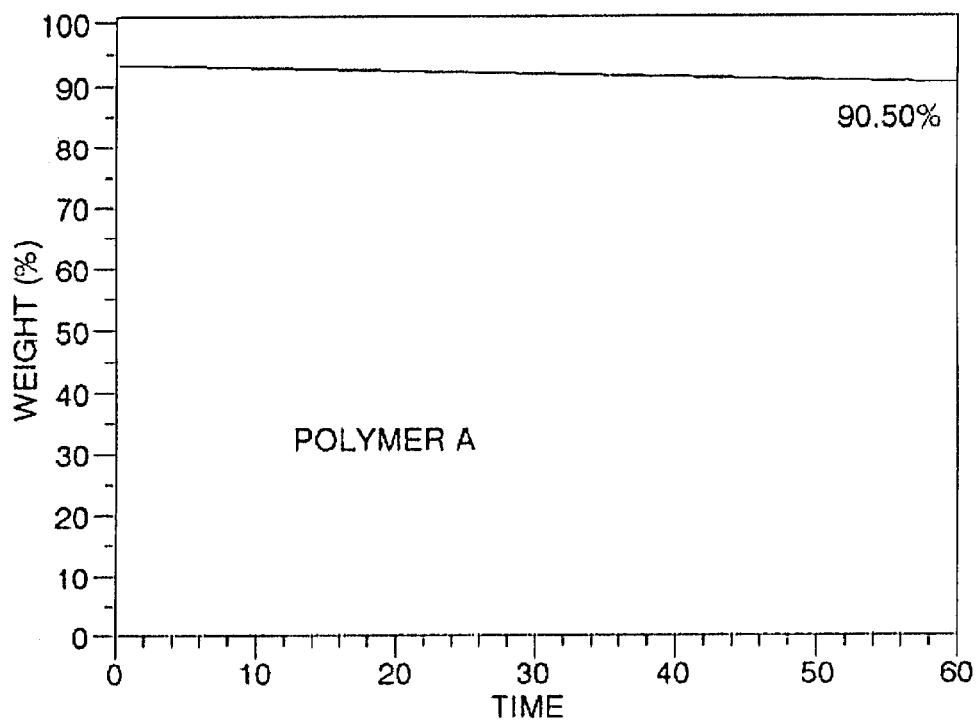
Figure 8:
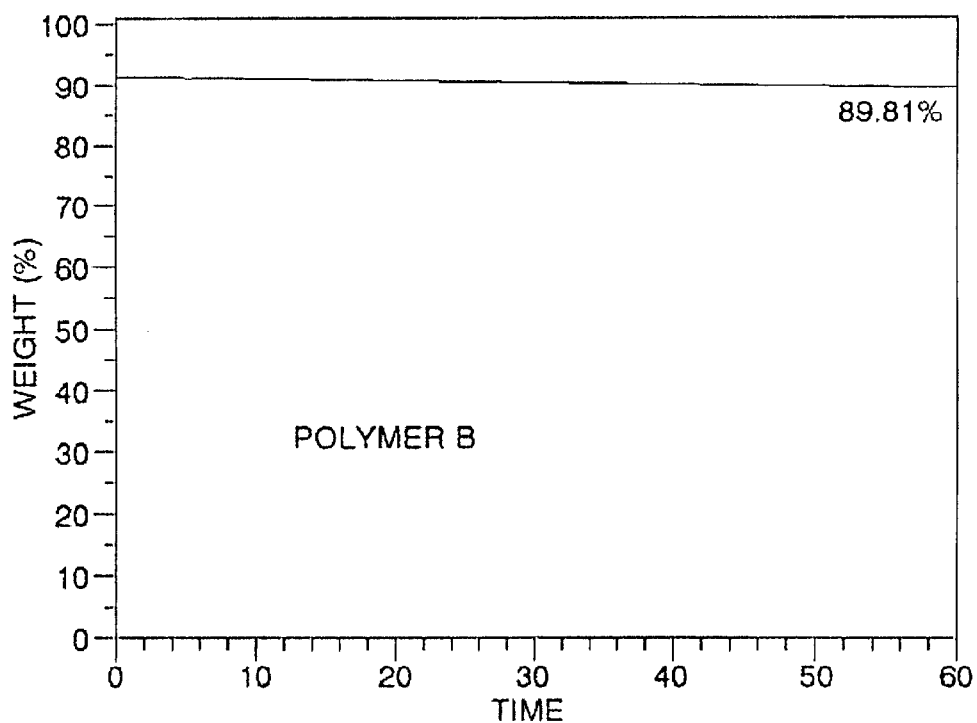

FIGS. 1–6 indicate that decomposition of the phenolic polymer begins at or near 400° C. FIGS. 7–9 are isotherms of Polymer A, Polymer B and the standard Conventional Resole, respectively, at 400° C. with a nitrogen purge of 20 cc/minute for 60 minutes. Polymer A exhibited a weight retention of roughly 90.5 percent, Polymer B a weight retention of roughly 89.8 percent, and the standard Conventional Resole exhibited a weight retention of roughly 80.5 percent. As compared to the standard Conventional Resole, Polymer A exhibited an increase in weight retention of roughly 12.4 percent, and Polymer B exhibited an increase in weight retention of roughly 11.7 percent.

There have been described here various formulations of resole resins containing varying levels HMTA plus DBE-2, furfuryl alcohol, or furfural. The resulting resins have shown surprising and unexpected results as carbon yield resoles and, correspondingly, as having surprisingly low volatile components.

It should be understood that various changes and modifications preferred in the embodiment described herein will be apparent to those skilled in the art. Such changes and modifications can be made without departing from the spirit and scope of the present invention and without demising the attendant advantages. It is, therefore, intended that such changes and modifications be covered by the appended claims.

What is claimed is:

1. A high-carbon yield resin comprising;
   a reaction product of a resole resin and a hexamethylenetetramine, such that the reaction product has a-viscosity in the range of from about 990 cps to about 5200 cps; and
   such that the reaction product has a carbon yield of at least 69 percent.

2. The high-carbon yield resin of claim 1 wherein the reaction product has a free phenol concentration in the range of about 20 percent to about 22 percent.

3. The high-carbon yield resin of claim 1 further comprising furfuryl alcohol.

4. The high-carbon yield resin of claim 3 wherein the furfuryl alcohol is present in a concentration of about 14 percent by weight of the high-carbon yield resin.

5. The high-carbon yield resin of claim 1 further comprising DBE-2 dibasic ester.

6. The high-carbon yield resin of claim 5 wherein the DBE-2 dibasic ester is present in a concentration of about 14 percent by weight of the high-carbon yield resin.

7. The high-carbon yield resin of claim 1 further comprising furfural.

8. The high-carbon yield resin of claim 7 wherein the furfural is present in a concentration of about 14 percent by weight of the high-carbon yield resin.

9. The high-carbon yield resin of claim 1 wherein the resole resin is liquid.

10. The high-carbon yield resin of claim 9 wherein the liquid resole resin has a phenol-to-formaldehyde ratio in the range of about 1.0-to-0.5 to about 1.0-to-3.5.

11. The high-carbon yield resin of claim 10 where the liquid resole resin has a phenol-to-formaldehyde ratio in the range of about 1.0-to-0.8 to about 1.0-to-1.5.

12. The high-carbon yield resin claim 1 wherein the hexamethylenetetramine is present in a concentration range of about 2 percent to about 20 percent based on a weight of the resole resin.

13. The high-carbon yield resin of claim 12 wherein the hexamethylenetetramine is present in a concentration range of about 8 percent to about 12 percent based on the weight of the resole resin.

14. A method for preparing a high-carbon yield resin comprising the steps of:

reacting a resole resin and a hexamethylenetetramine to an endpoint, the endpoint selected from a group consisting of a range of measured viscosity and a range of measured percentage of free phenol;

wherein the step of reacting the resole and the hexamethylenetetramine comprises the steps of:

combining a hexamethylenetetramine with the resole resin;

heating the resole resin and hexamethylenetetramine combination;

holding the combination at an elevated temperature for a period of time; and cooling the combination.

15. The method of claim 14 wherein the range of measured viscosity is from about 990 cps to about 5200 cps.

16. The method of claim 14 wherein the range of measured percentage of free phenol is in the range of about 20 percent to about 22 percent based on the weight of the resole resin.

17. The method of claim 14 wherein the combination of resole resin and hekamethylenetetramine is heated to about 80° C.

18. The method of claim 17 where the period of time is about 5 minutes to about 30 minutes.

19. The method of claim 14 wherein reacting the resole and the hexamethylenetetramine further comprises the step of:

heating the resole resin prior to the step of combining the hexamehylenetetramine.

20. The method of claim 14 wherein reacting the resole and the hexamethylenetetramine further comprises the step of:

adding a diluent to the resole resin and hexamethylenetetramine combination, wherein the diluent is a solvent selected from the group consisting of furfunyl alcohol, DBE-2 dibasic ester, furfural, and combinations thereof.

* * * * *